United States Patent [19]

Gilbert

[11] Patent Number: 4,521,172

[45] Date of Patent: Jun. 4, 1985

[54] MOULDING MACHINES

[75] Inventor: Barrie W. Gilbert, Stonnall, England

[73] Assignee: Bipel Limited, Sutton Coldfield, England

[21] Appl. No.: 506,473

[22] Filed: Jun. 21, 1983

[30] Foreign Application Priority Data

Jul. 3, 1982 [GB] United Kingdom ............... 8219310

[51] Int. Cl.³ ................................................ B29C 3/00
[52] U.S. Cl. ..................................... 425/73; 425/420; 425/546
[58] Field of Search ................ 425/73, 233, 546, 420, 425/812, DIG. 47, DIG. 60; 249/141

[56] References Cited

U.S. PATENT DOCUMENTS 3,267,517 8/1966 Altermatt .............................. 425/73
4,028,042 6/1977 Goodfellow et al. ............... 425/233
4,053,266 10/1977 Friedrichs et al. .................... 425/73
4,417,864 11/1983 Shigeo et al. ......................... 425/73

FOREIGN PATENT DOCUMENTS 1603844 12/1981 United Kingdom .
1603845 12/1981 United Kingdom .

Primary Examiner—Jay H. Woo
Assistant Examiner—J. Fortenberry
Attorney, Agent, or Firm—Cushman, Darby & Cushman

[57] ABSTRACT

A moulding machine is provided with door means which are operable to define with external frame members of the machine a closed, air-tight chamber enclosing the moulding area of the machine. The frame members and/or spaces between them (other than a space which is in use closed by the door means) are rendered air-tight, if necessary.

10 Claims, 1 Drawing Figure

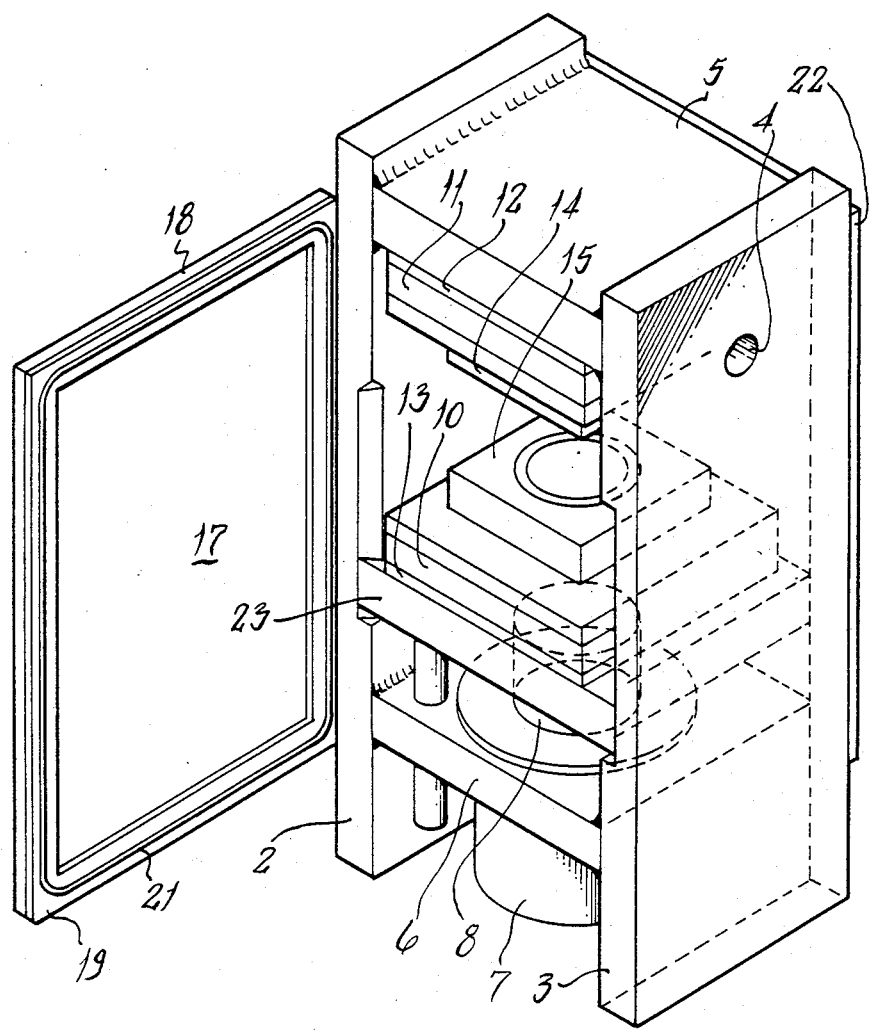

MOULDING MACHINES

This invention relates to moulding machines particularly, but not exclusively for use in the moulding of rubber or plastics.

The specifications of our British Pat. Nos. 1603844 and 1603845 describe, respectively, injection and compression moulding machines which incorporate a vacuum box to facilitate removal of air and/or trapped gases and volatile products evolved or released during the moulding process. The vacuum box in question has a relatively simple construction which exhibits excellent seal wear characteristics. This is due at least in part to the use of a continuous piston seal in combination with a simple face seal.

Whilst the machines described in the aforesaid patent specifications perform well, especially for the moulding of rubber products such as seals and gaskets, the construction adopted is both expensive and complex to make. It is an object of the present invention to provide a vacuum box of reduced complexity.

According to the present invention, a moulding machine is provided with door means operable to define with the external frame members of the machine a closed, air-tight chamber around the moulding area of the moulding machine. The moulding area of the machine is that part of the machine which contains the moulding tool, which is normally in two parts ("halves"). The halves are relatively displaceable by a hydraulic ram so that when closed together, the halves define at least one mould cavity. When separated, the moulding or mouldings can be withdrawn from the cavity or cavities and replaced by a fresh charge of moulding material.

The external frame members of an injection or compression moulding machine are usually very substantial, to withstand the forces developed in operation of the machine. It is not therefore difficult to render the frame members and/or the spaces between them sensibly airtight; it is preferred that a vacuum connection be provided to facilitate the evacuation of the moulding area. It is also preferred that door means be provided on two opposite sides of the machine so that access can be had to the moulding area from either or both sides (i.e. from front or back of the machine.) This is convenient for operational and maintenance purposes. One end, or in the case of a compression moulding press, the base portion, is normally closed off by the hydraulic ram assembly, or by the lower platen in the case of a downstroking press with the ram assembly at the top. Sealing the other end presents no great difficulty as it usually includes a solid and very substantial plate member.

It is preferred that the door means be hinged to the edge of one frame member, the whole of that face of the machine being made flat in order to make it possible to use a flat door incorporating a simple face seal of a suitable size, mounted in a recess in the door. The seal may equally well be provided in or on the flat face of the machine, of course. Where back and front doors are provided, it is preferred that they are of similar construction to one another, thereby simplifying the hardware needed. As the door means will have to withstand atmospheric pressure (in use) it may be necessary to furnish it with stiffening ribs to prevent buckling which could lead to seal failure or other damage.

It will be well-known that a conventional compression moulding press usually has substantially solid side frames. However, that is not always the case, and this applies with even greater force to injection moulding machines. The invention can in fact be applied to such machines, although it will clearly be necessary to "fill-in" the machine sides with air-tight panels to define a moulding area which can be closed off by the door means. The invention therefore includes a machine adapted in this way. It will be appreciated that the operation of an injection moulding machine or a compression moulding press fitted with a vacuum box requires that the operation of the box and the creation of the vacuum inside it must be integrated into the control sequence for the remainder of the machine. The door means can be interfaced to the control system via microswitches located to detect closure or otherwise of the door means. The door means can also be used to activate safety circuitry effective to prevent operation of the machine with the door means open.

In order that the invention be better understood a preferred embodiment of it will now be described by way of example with reference to the accompanying drawing in which the sole FIGURE is a perspective view of a compression moulding press in accordance with the invention.

In the FIGURE, the press comprises two side frame members 2,3 respectively. These are essentially solid plates, a vacuum connection 4 being provided in member 3. Between the side frame members there is a moulding area bounded by a top plate 5 and a lower table 6. The latter incorporates an up-stroking hydraulic cylinder 7 and an associated ram 8. The ram serves to displace a sliding table 23 and a platen 10 towards a fixed platen 11, which is mounted to the top plate 5. The fixed platen has in this case built-in induction heating means (not shown) and is insulated for preventing or reducing heat loss, at 12. Likewise the moving platen is also heated and insulated, at 13. The two platens carry the respective halves of a moulding tool 14, 15. The press is thus far almost conventional; its detailed constructional features need not be further discussed for present purposes. The whole face of the press represented by the edges of the side frame members and the top plate and the lower table is made flat, as by grinding or milling. A door 17 is hinged to the member 2. It comprises a panel 18 and a reinforcing rim 19. The latter incorporates a groove in which is installed an O-ring face seal 21. The opposite side of the press (the back) is also provided with a door 22, part only of which can be seen in this view.

The operation of the press is straightforward. The acutal details of a moulding operation need not be elaborated on here, but it will be appreciated that once the tool cavity has been loaded with a shot of moulding material such as a rubber dough, the doors can be closed and a vacuum applied through the connection 4 to evacuate the moulding area defined within the press. The vacuum will serve to hold the doors firmly shut, although for safety reasons interlock catches will normally be fitted. The press itself can then be operated in the conventional way, it being possible to open the moulding tool (by separating the platens with the ram) so as to allow volatiles and/or air to be removed, but without of course opening the doors, unless necessary. This highlights a very important feature of the press of this invention. That is that no matter what technical operations take place inside the vacuum box, there are no moving seals of any kind to be damaged and/or worn out. The internal workings of the press are remote from the door means and from the seals.

Whilst the foregoing description has been given in terms only of a compression moulding press, the same principles apply to an injection moulding machine.

What I claim is:

1. A compression moulding press having an external supporting frame in the form of a box constituted by two said walls defining press sidewall tension members and spaced apart by an integral press top member coextensive with the side walls and a bottom table member reaction surface coextensive with the side walls, and a back member between the press top member, the bottom table member and the two side members to define therebetween a moulding area for the press accessible from outside the press through an aperture defined between edge portions of said side walls and members, together with door means co-operable with said edge portions to close said aperture to create a closed chamber from and integral with said external supporting frame, whereby said side walls, press top member, bottom table member, back member and door means defined a sealed space including said moulding area which can be at least partly evacuated.

2. The press of claim 1 wherein said members and any spaces therebetween, other than said aperture, are rendered substantially airtight.

3. The press of claim 1 including means for evacuating said area when the aperture is closed by the door means.

4. The press of claim 1 wherein second door means are provided to enable access to the moulding area from another side of the press.

5. The press of claim 1 wherein the door means includes a peripheral portion which in use co-operates sealingly with said edge portions.

6. The press of claim 5 wherein said peripheral portion includes a face seal which in use co-operates sealingly with said edge portions.

7. The press of claim 5 wherein said edge portions include a face seal which in use co-operates sealingly with the door means.

8. The press of claim 1 wherein said box constitutes substantially the entire structural frame of the press.

9. The press of claim 1 wherein the door means is hinged to one of said side frame members.

10. A compression moulding press having an external supporting frame in the form of a box constituted by two generally vertically-disposed side wall frame members spaced apart laterally by an integral press top member coextensive with the side wall frame members, a bottom table member coextensive with the side wall frame members and forming the reaction surface for a press, and a back member between the side wall frame members, press top member and bottom table member, to define between said members a volume comprising a moulding area for the press and accessible from outside the press through a first aperture defined between edge portions of said members to create a closed chamber from and integral with said external supporting frame, means rendering said members and any other aperture between them substantially airtight, door means operable to close said first aperture, together with means for evacuating said volume, whereby in use, closure of said door means together with said side wall frame members, press top member, bottom table member and back member defines a sealed space and enables the at least partial evacuation of said volume before, during and after a moulding operation therein.

* * * * *